US008228290B2

(12) United States Patent
Verschueren

(10) Patent No.: US 8,228,290 B2
(45) Date of Patent: Jul. 24, 2012

(54) ELECTROPHORETIC DISPLAY DEVICE WITH OVERLAPPING FIRST AND SECOND ROW AND COLUMN ELECTRODES

(75) Inventor: Alwin Rogier Martijn Verschueren, Eindhoven (NL)

(73) Assignee: Adrea, LLC, Sunnyvale, CA (US)

( * ) Notice: Subject to any disclaimer, the term of this patent is extended or adjusted under 35 U.S.C. 154(b) by 828 days.

(21) Appl. No.: 12/377,700

(22) PCT Filed: Aug. 13, 2007

(86) PCT No.: PCT/IB2007/053205
§ 371 (c)(1),
(2), (4) Date: Feb. 17, 2009

(87) PCT Pub. No.: WO2008/020390
PCT Pub. Date: Feb. 21, 2008

(65) Prior Publication Data
US 2010/0225672 A1    Sep. 9, 2010

(30) Foreign Application Priority Data

Aug. 17, 2006   (EP) .................................... 06119105

(51) Int. Cl.
G09G 3/34      (2006.01)
G06F 3/038     (2006.01)
G02B 26/00     (2006.01)
(52) U.S. Cl. .......................... 345/107; 345/215; 359/296
(58) Field of Classification Search .................. 345/107, 345/215, 690; 359/296
See application file for complete search history.

(56) References Cited

U.S. PATENT DOCUMENTS

| 6,639,580 B1* | 10/2003 | Kishi et al. ..................... 345/107 |
| 6,781,745 B2* | 8/2004 | Chung et al. .................. 359/296 |
| 2002/0180687 A1 | 12/2002 | Webber |
| 2003/0038772 A1 | 2/2003 | De Boer et al. |
| 2003/0231162 A1* | 12/2003 | Kishi ............................. 345/107 |
| 2005/0122299 A1 | 6/2005 | Hoshino |
| 2006/0050362 A1 | 3/2006 | Johnson et al. |

FOREIGN PATENT DOCUMENTS

| WO | 03023510 A1 | 3/2003 |
| WO | 2005093508 A1 | 10/2005 |
| WO | 2005104078 A1 | 11/2005 |

OTHER PUBLICATIONS

The Written Opinion of the International Searching Authority PCT/IB2007/053205.

* cited by examiner

*Primary Examiner* — Bipin Shalwala
*Assistant Examiner* — Keith Crawley
(74) *Attorney, Agent, or Firm* — Finnegan, Henderson, Farabow, Garrett & Dunner

(57) ABSTRACT

An electrophoretic display device comprises an array of rows and columns of display pixels. Each pixel comprises first and second row electrodes (12a, 12b) and first and second column electrodes (14a, 14b). Each row and column electrode has a branch (12a', 12b', 14a', 14b') so that four overlaps are defined between an electrode and an electrode branch. Between each of the four branch/electrode overlaps, a respective particle reservoir (40a,40b,40c,40d) is located, the respective branch/electrode pair being for controlling movement of particles associated with the respective particle reservoir (40a,40b,40c,40d). This provides a display design which can be implemented as a passive matrix, requiring only two column electrodes and two row electrodes per pixel with four particles.

22 Claims, 12 Drawing Sheets

ELECTROPHORETIC DISPLAY DEVICE WITH OVERLAPPING FIRST AND SECOND ROW AND COLUMN ELECTRODES

This invention relates to electrophoretic display devices.

Electrophoretic display devices are one example of bistable display technology, which use the movement of particles within an electric field to provide a selective light scattering or absorption function.

In one example, white particles are suspended in an absorptive liquid, and the electric field can be used to bring the particles to the surface of the device. In this position, they may perform a light scattering function, so that the display appears white. Movement away from the top surface enables the colour of the liquid to be seen, for example black. In another example, there may be two types of particle, for example black negatively charged particles and white positively charged particles, suspended in a transparent fluid. There are a number of different possible configurations.

It has been recognised that electrophoretic display devices enable low power consumption as a result of their bistability (an image is retained with no voltage applied), and they can enable thin display devices to be formed as there is no need for a backlight or polariser. They may also be made from plastics materials, and there is also the possibility of low cost reel-to-reel processing in the manufacture of such displays.

If costs are to be kept as low as possible, direct drive addressing schemes are employed. The most simple configuration of display device is a segmented reflective display, and there are a number of applications where this type of display is sufficient. A segmented reflective electrophoretic display has low power consumption, good brightness and is also bistable in operation, and therefore able to display information even when the display is turned off.

However, improved performance and versatility is provided using a matrix addressing scheme. An electrophoretic display using passive matrix addressing typically comprises a lower electrode layer, a display medium layer, and an upper electrode layer. Biasing voltages are applied selectively to electrodes in the upper and/or lower electrode layers to control the state of the portion(s) of the display medium associated with the electrodes being biased.

Another type of electrophoretic display device uses so-called "in plane switching". This type of device uses movement of the particles selectively laterally in the display material layer. When the particles are moved towards lateral electrodes, an opening appears between the particles, through which an underlying surface can be seen. When the particles are randomly dispersed, they block the passage of light to the underlying surface and the particle colour is seen. The particles may be coloured and the underlying surface black or white, or else the particles can be black or white, and the underlying surface coloured.

An advantage of in-plane switching is that the device can be adapted for transmissive operation, or transflective operation. In particular, the movement of the particles creates a passageway for light, so that both reflective and transmissive operation can be implemented through the material. This enables illumination using a backlight rather than reflective operation. The in-plane electrodes may all be provided on one substrate, or else both substrates may be provided with electrodes.

Active matrix addressing schemes are also used for electrophoretic displays, and these are generally required when bright full colour displays with high resolution greyscale are required. Such devices are being developed for signage and billboard display applications, and as (pixellated) light sources in electronic window and ambient lighting applications.

Colours can be implemented using colour filters or coloured reflectors, and the display pixels then function simply as greyscale devices. However, colour filtering is at the expense of brightness.

A solution to this problem is to use a double stack of in-plane controllable non-scattering cyan, magenta, yellow and black particles, for example as described in WO2005/093508. This ensures maximal brightness, as every pixel can have every colour. However, this solution still has the drawback in that it needs an expensive active matrix, and a full colour pixel requires four separate active matrix thin film transistors (TFTs).

The use of a passive matrix provides a lower cost solution, and indeed monochrome passive matrix in-plane electrophoretic displays are known as described above, and for example as shown in U.S. Pat. No. 6,639,580. For each pixel, these require a row electrode, a column electrode and a common electrode.

The use of an electrophoretic material with a threshold response is also known within a passive matrix addressing scheme. Matrix addressing typically involves writing data to each row in turn using column data lines. The addressing scheme requires that when data is being written to one row, the data on the column lines does not corrupt the data already written to previous rows. For active matrix devices, the active matrix switches provide the required isolation of written pixels from the column lines. The use of a threshold response of the electrophoretic material has been proposed for passive matrix addressing schemes, to enable this independent writing of pixel data. The addressing scheme then provides voltages to the rows and columns (and the common electrode if required) to take advantage of the threshold response of the electrophoretic material.

There are however difficulties in extending the passive matrix approach to a full colour implementation.

One approach would again be to use four different coloured particles, and to provide four column electrodes, four row electrodes and a common electrode for the control of the pixel particles. This number of addressing conductors complicates the manufacturing process as well as using a significant amount of pixel space, so that this is not a practical solution to the problem of providing full colour passive matrix addressing.

According to the invention, there is provided an electrophoretic display device, comprising an array of rows and columns of display pixels, wherein each pixel comprises first and second row electrodes and first and second column electrodes, wherein the first column electrode has a branch which overlaps with the first row electrode, the first row electrode has a branch which overlaps with the second column electrode, the second column electrode has a branch which overlaps with the second row electrode, and the second row electrode has a branch which overlaps with the first column electrode, and wherein between each of the four branch/electrode overlaps, a respective particle reservoir is located, the respective branch/electrode pair being for controlling movement of particles associated with the respective particle reservoir.

The invention thus provides a display design which can be implemented as a passive matrix, requiring only two column electrodes and two row electrodes per pixel with four particles. This saves a considerable number of connections.

The movement of the particles associated with each particle reservoir preferably has threshold voltage behaviour, so that a passive matrix addressing scheme can be implemented.

The reservoirs preferably define regions outside the pixel viewing area, and a central part of the pixel defines the viewing area. Each pixel preferably comprises first and second particle chambers within the viewing area, the first and second particle chambers being stacked one above the other. In this way, each chamber can contain two different coloured particles, so that the two chambers together can be used to provide a full colour display output.

One particle chamber is then connected to two of the reservoirs, and the other particle chamber is connected to the other two of the reservoirs. The particles in one of the reservoirs associated with a particle chamber preferably has positively charged particles, and the particles in the other of the reservoirs associated with the same particle chamber has negatively charged particles. This enables independent control of the particle movement from the two reservoirs.

The first and second row electrodes can be for controlling the movement of particles of the reservoirs associated with one of the particle chambers, and the first and second column electrodes can be for controlling the movement of particles of the reservoirs associated with the other of the particle chambers. The row electrodes can be in one plane and the column electrodes can be in another plane, with the particle chambers sandwiched between.

The first and second row electrode branches can be for controlling the movement of particles within the reservoirs associated with said other of the particle chambers with threshold, and the first and second column electrode branches are for controlling the movement of particles within the reservoirs associated with said one of the particle chambers with threshold. This enables independent control of the four different particles, using the threshold voltage and the different particle polarity.

The display thus has a threshold voltage applied to the control of particles within the particle reservoirs, in particular transversely up and down the reservoirs, but not for the lateral in-plane particle movement between the visible pixel area and the top of the reservoir. The independent control of the four particle species is thus obtained using transverse movement and a threshold, and using lateral particle movement without threshold.

The threshold can be provided by a layer between the base of the reservoir and the respective electrode branch.

Preferably, movement of the particles between a reservoir and a particle chamber is substantially laterally, so that in-plane switching is provided, whereas the reservoir stores particles out of the lateral plane of particle movement. This prevents diffusion of the particles between the reservoir and the chamber.

The particles preferably comprise absorbing particles, for example one of cyan, magenta, yellow and black particles in each of the four reservoirs.

The pixels can be bounded by the two row electrodes and the two column electrodes, and each pixel can also be substantially bounded by the two row electrode branches and the two column electrode branches.

Each row and column electrode can be shared between two neighbouring pixels, so that half the number of connections is used, and diminishing the risk of shorts. Of course, this is at the expense of a slight loss in resolution.

The invention also provides a method of driving an electrophoretic display device, comprising an array of rows and columns of display pixels, each pixel comprising four particle reservoirs for four different particle species, first and second row conductors and first and second column conductors, the method comprising:

resetting the display pixels by driving all particle species into their respective reservoirs;

moving particles of the first species towards an access surface of the respective reservoir, and moving particles of the second species towards an access surface of the respective reservoir, the particle movement being carried out for pixels in turn;

spreading particles of the first and second species within a first chamber, the spreading being carried out for all pixels in parallel, and providing lateral movement of particles from the access surface of the reservoirs into a viewing area of the pixel;

moving particles of the third species towards an access surface of the respective reservoir, and moving particles of the fourth species towards an access surface of the respective reservoir, the particle movement being carried out for pixels in turn; and spreading particles of the third and fourth species within a second chamber, the spreading being carried out for all pixels in parallel, and providing lateral movement of particles from the access surface of the reservoirs into a viewing area of the pixel.

This method provides independent control of four particle species, within two chambers. Hold voltages can be applied to the row and column conductors to complete the drive cycle.

Moving particles preferably comprises applying row and column conductor voltages such that a threshold voltage between a row and column conductor pair is exceeded only for a selected pixel, one of the pixel reservoirs being provided between the row and column conductor pair. Only when the threshold is passed will the particles be controlled to move, and this enables independent control of each particle species within each pixel.

Resetting the display pixels may comprise:
moving particles of the four species laterally towards an access surface of their respective reservoirs from the viewing area of the pixel;

moving particles of the first and second species within the respective reservoir towards a base surface of the respective reservoir; and moving particles of the third and fourth species within the respective reservoir towards a base surface of the respective reservoir.

The method thus uses lateral movement in an out of the viewing area and transverse movement to store particles or release them from their respective reservoirs.

Examples of the invention will now be described in detail with reference to the accompanying drawings, in which.

The same references are used in different Figures to denote the same layers or components, and description is not repeated.

The invention provides a pixel layout and drive method for an electrophoretic display which can be implemented as a passive matrix, and requires only two column electrodes and two row electrodes per pixel with four particles. There are first and second row electrodes and first and second column electrodes, each electrode having a branch/spur, so that four separate overlap areas are defined, each overlap area between a unique pair of row and column.

Figure 1:
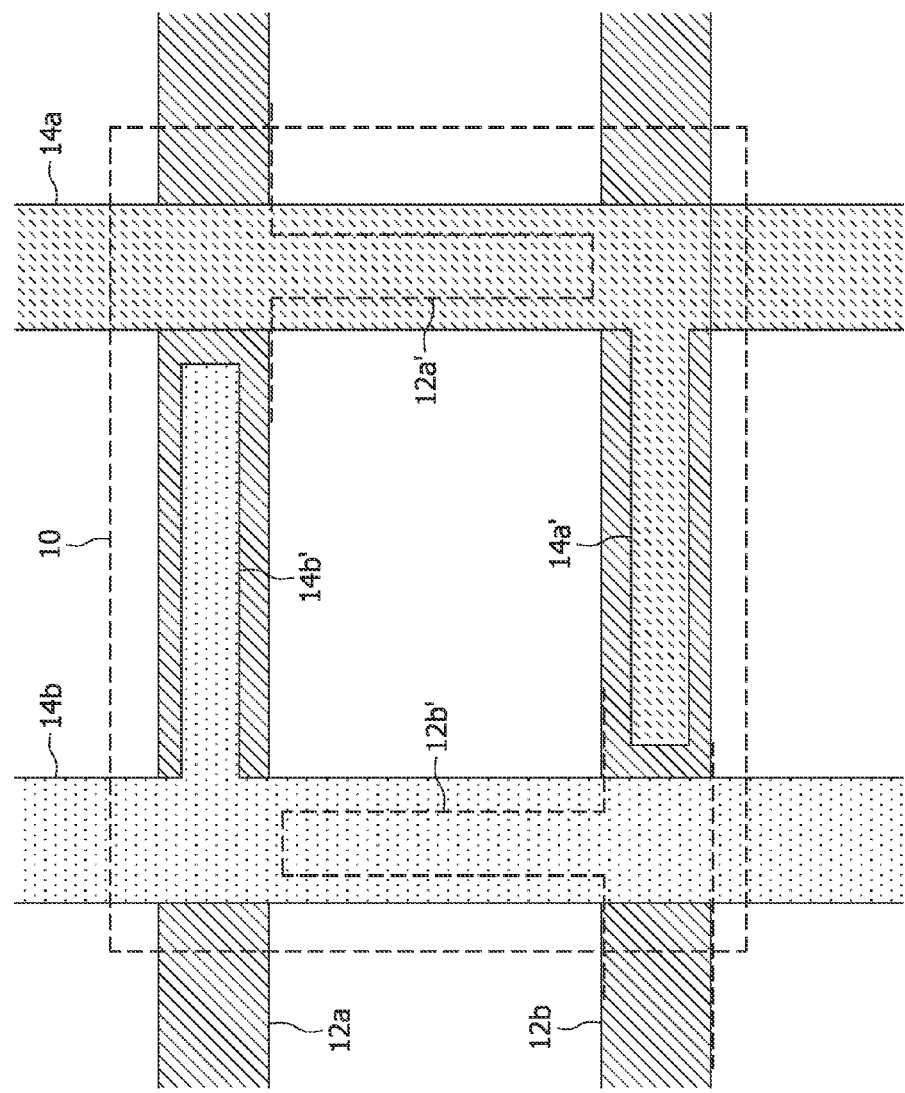
FIG. 1 shows a pixel layout of the invention.

FIG. 1 shows the electrode layout for one pixel 10.

In one plane, there are two row electrodes 12a,12b, and in another parallel plane there are two column electrodes 14a, 14b. Each row and column electrode has a perpendicular branch 12a', 12b', 14a', 14b' so that four overlap regions are defined, with an overlap region at each row/electrode pair. Between each of the four branch/electrode overlaps, a respective particle reservoir is located, and the respective branch/electrode pair is for controlling movement of particles associated with the respective particle reservoir. Thus, a unique row/electrode pair is associated with each reservoir, and this enables independent control of four particle species in passive matrix manner, in particular using a threshold voltage response, as will be described in further detail below.

The pixel defines two particle chambers, stacked one above the other. Each particle chamber contains two particle species, and is in fluid communication with two of the reservoirs. Thus, the pixel effectively acts as two stacked independent pixels, but integrated into a single structure.

Figure 2:
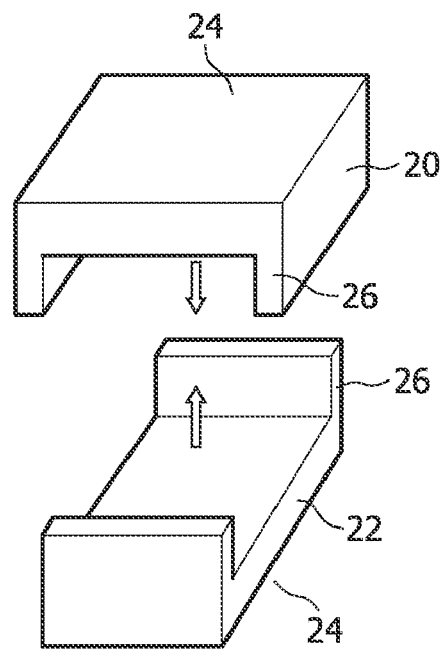
FIGS. 2 to 6 shows the steps to fabricate a display device of the invention.

One way to fabricate the pixel will be described in detail with reference to FIGS. 2 to 4.

Each surface of the pixel defines one of the chambers and two of the reservoirs. To create this layout, two identical embossing moulds 20,22 shown in FIG. 2 are impressed on a plastic transparent substrate from opposite sides, creating the two identical chambers inside the substrate that are not connected.

Each mold has a main part 24 and side legs 26 which are deeper, and thereby define lateral cavities extending beyond and below the main chamber defined by the main part 24.

The two molds 20,22 are identical and rotated by 90 degrees with respect to each other. Alternative techniques to create the chambers are also possible, such as abrasive powder machining, sandblasting, micro-electrical discharge machining, laser ablation or injection moulding.

The top chamber 20 is open at the top side of the substrate, and optionally also at the bottom side in the region of the reservoirs (if the mold is punched through).

Figure 3:
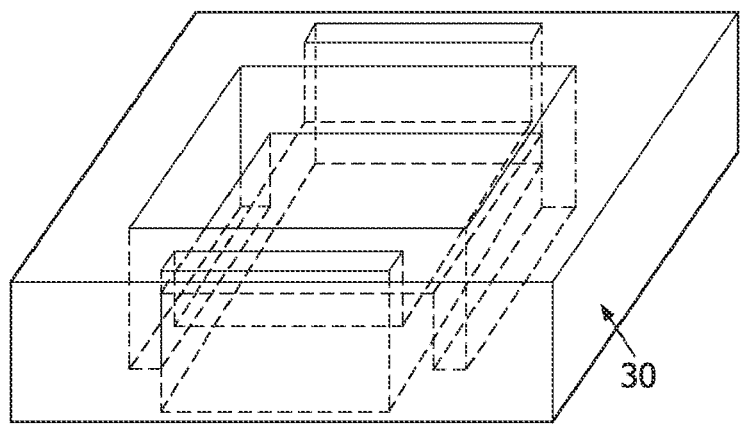

FIG. 3 shows the resulting substrate shape 30.

Figure 4:
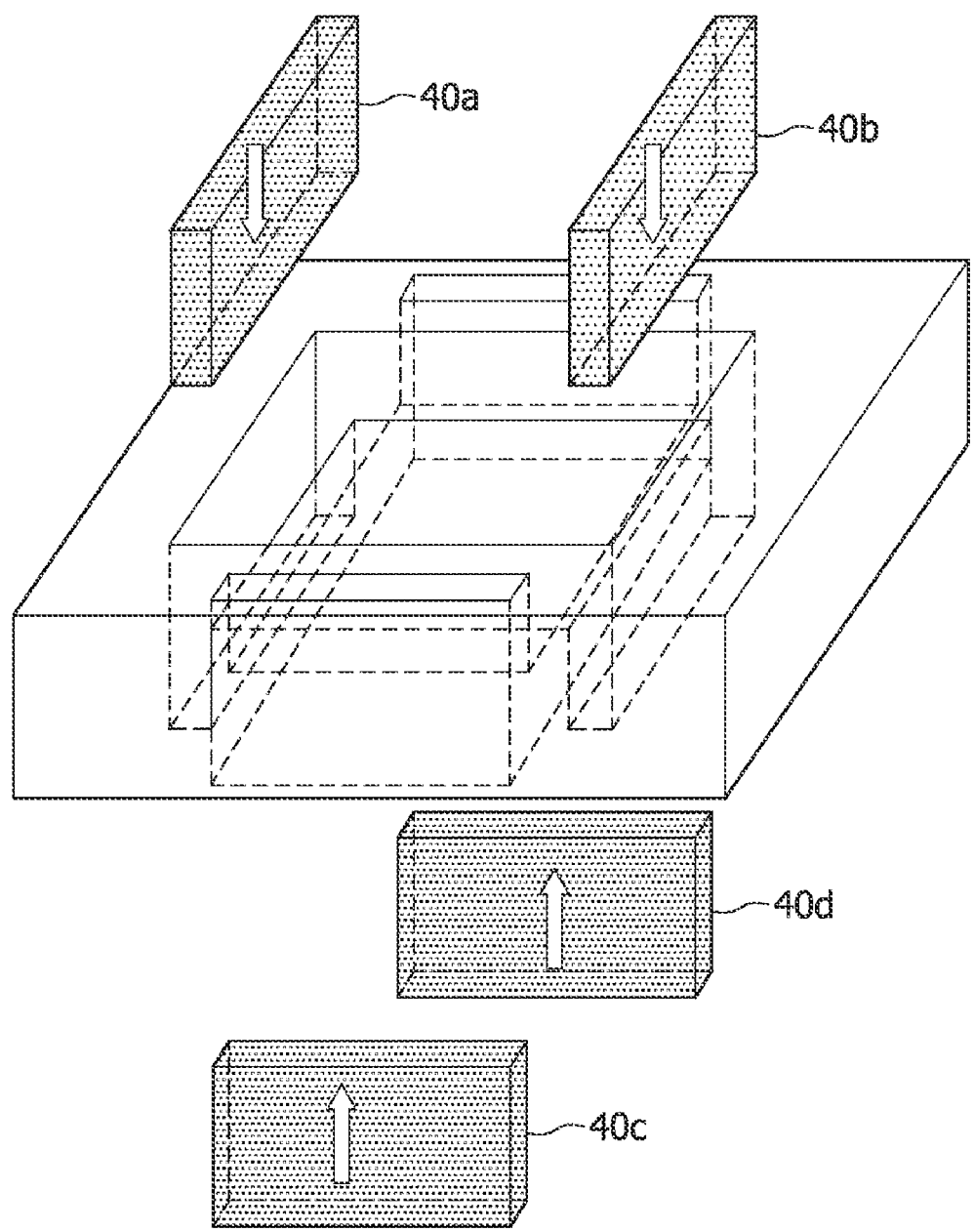
Figure 5:
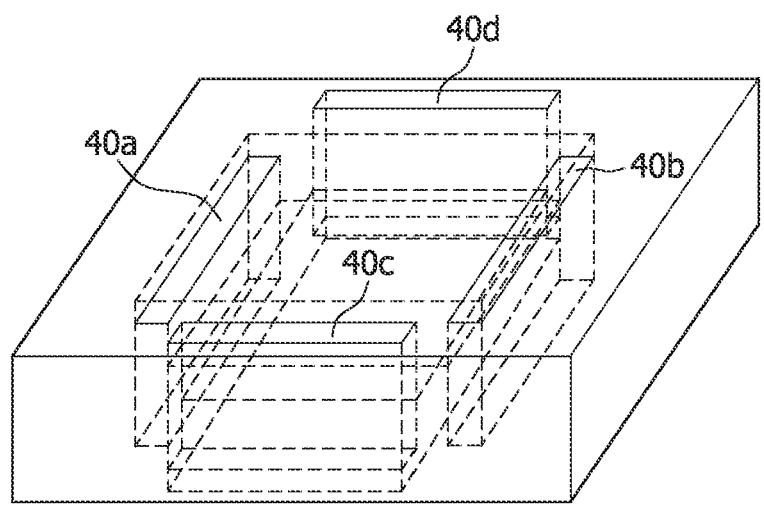

Four ink reservoirs are inserted at the ends of the two chambers in the lateral cavities, and this is shown in FIG. 4, with the ink reservoirs shown as 40a to 40d. The ink reservoirs can consist of a porous or sponge-like material with voids filled up with pigment particles. The pigment particles can for instance be cyan and yellow on top, and magenta and black at the bottom, and preferably are non-scattering absorbing particles. FIG. 5 shows the reservoirs 40a to 40d in place.

The purpose of the reservoirs is to hold the pigment particles inside in the absence of electric fields (i.e. suppressing diffusion), while only if a sufficiently large electric field is applied, the charged pigment particles can move and be able to leave the reservoir. The porous material can be created by local polymerisation of high molecular weight polymers. Such polymers are known for example from US2002/0180687 to create a "shear thinning" rheological effect, exhibiting a high viscosity for the low shear stress (in case of diffusion) and a low viscosity for high shear stress (in case of migration).

In this way, diffusion is suppressed, while migration is still possible under the influence of electric fields. Alternatively, this suppression can also be achieved by making use of particles that exhibit intrinsic bistability, for instance by reversible coagulation or sticking to surfaces.

The chambers (i.e. the main chamber areas and the lateral cavities) are then filled with transparent insulating oil, for example dodecane or isopar-G, and covered with electrode plates.

Figure 6:
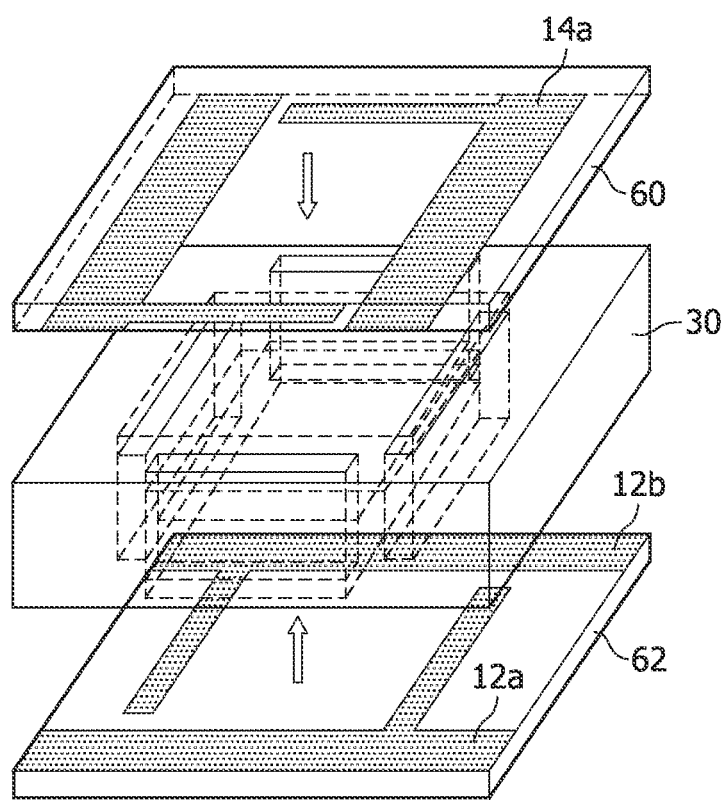

FIG. 6 shows the top and bottom electrode plates 60, 62. In the example shown, the top electrode plate 60 has the column conductor pattern 14a,14b of FIG. 1 and the bottom electrode plate 62 has the row conductor pattern 12a,12b of FIG. 1.

The column electrodes 14a,14b are in direct contact with the upper chamber and overlap the cyan and yellow ink reservoirs 40a,40b. Preferably, the porous or sponge-like material of the reservoirs is limited to the inside of the chamber and does not make direct contact with the column electrodes.

The row electrodes 12a,12b are in contact with the bottom chamber, overlapping the black and magenta reservoirs but again preferably without direct contact.

The side branches of the column electrode overlap the black and magenta reservoirs of the lower chamber, and the branches of the row electrodes overlap the cyan and yellow reservoirs of the top chamber. Thus, each row/column overlap is associated with a different ink reservoir.

In this preferred example, the mold is not punched through, such that the branches 12a',12b',14a',14b' of the electrodes are not in direct contact with the ink reservoirs but separated by a thin layer of the substrate material. It has been shown that a coating between the electrode and the suspension can create an electrical threshold. The thin layer of substrate thus functions as such a coating, or alternatively the polymer of the porous or sponge-like material can provide this function. In either case, the particles inside the reservoirs only start moving when a sufficiently strong electric field is applied between the corresponding column and row electrodes.

The material of the electrodes can be a non-transparent conductor, and preferably is a black metal (for instance black chrome) such that the ink reservoirs are not visible to the viewer.

Finally, the electronic paper display can (optionally) be completed with an external reflector, on the bottom side close to the chamber with black and magenta ink reservoirs.

Figure 7:
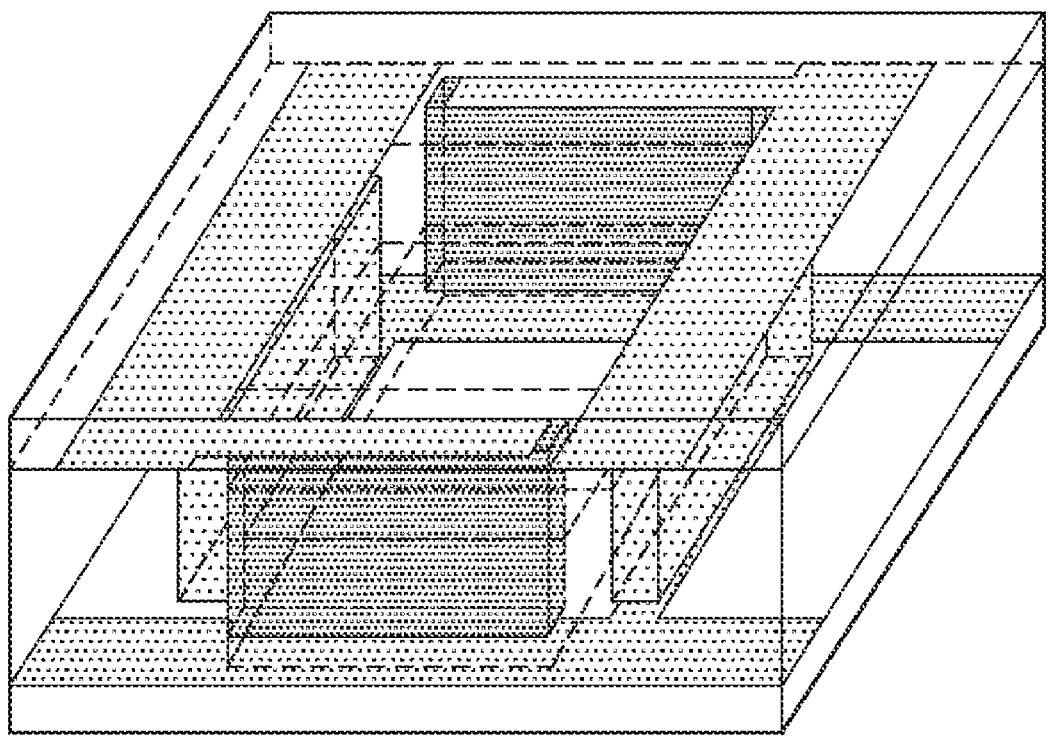
FIG. 7 shows one pixel of a completed display device of the invention.

FIG. 7 shows the completed display device.

The way in which the display can be driven will now be explained with reference to FIGS. 8 and 9.

The driving of a single pixel will be discussed. The pixel consists of 2 row electrodes contacting the bottom chamber with black and magenta particles, and these are denoted R1 and R2 for simplicity. There are 2 column electrodes contacting the top chamber with cyan and yellow particles, and these are denoted C1 and C2 for simplicity.

Figure 8A:
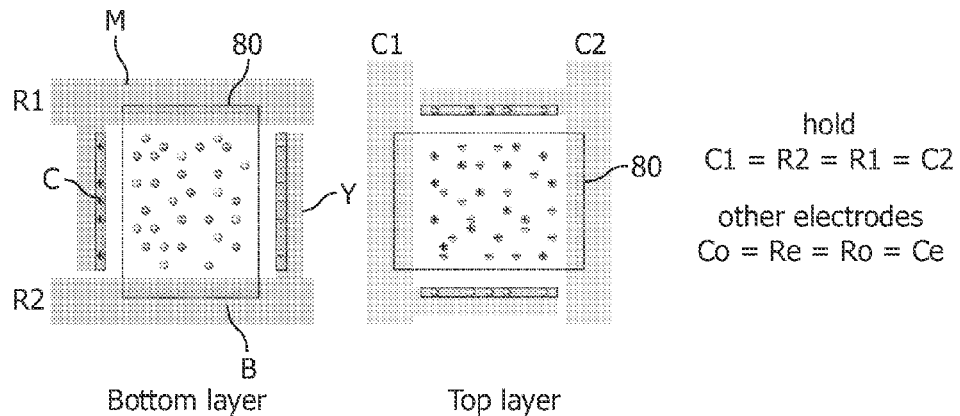
FIGS. 8A to 8E show steps used to reset the device of the invention.

The boundaries of the chambers are indicated with rectangles 80 as shown in FIG. 8A. In the bottom layer carrying the row electrodes, the chamber boundary 80 includes the connection to the black and magenta reservoirs, and the cyan and yellow reservoirs are separated from the bottom chamber. Similarly, in the top layer carrying the column electrodes, the chamber boundary 80 includes the connection to the cyan and yellow reservoirs, and the black and magenta reservoirs are separated from the top chamber.

The following principles hold:
  particles inside the reservoirs do not move except when the electric field exceeds a certain threshold, indicated by for instance R1>>C1 (first row voltage much larger than first column voltage, in practice a potential difference of 10-20V).

particles inside the visible part of the bottom chamber only experience the electric fields generated by the first and second row electrodes, and particles inside the visible part of the top chamber only experience the electric fields generated by the first and second column electrodes. The reason for this is that the conductivity of the suspension (i.e. oil plus particles plus charging agent) is much larger than the conductivity of the substrate material, and therefore the electric field lines will concentrate inside the chambers and not penetrate the substrate barrier between the two chambers.

The combination of these two effects makes it possible to control the particles in the visible part of the chambers in-plane by applying a modest voltage on a pair of row or column electrodes, and to store the particles in the reservoirs by applying a sufficiently large voltage on the appropriate combination of a row and column electrodes.

In this way, the visible part of the pixel can be controllably driven to fill with any desired combination of cyan, magenta, yellow and black particles, such that any desired colour can be created with high brightness.

The driving procedure consists of a reset phase and a writing phase. Before the reset phase, the pixel has been controlled and is in a hold state. This hold state is shown in FIG. 8A, and represents the position before the reset phase. In the hold state, the pixel may have any combination of the four particle species. As shown in FIG. 8A, the rows and columns are all driven to the same voltage (R1=R2=C1=C2). The same is true of all other pixels.

The reservoirs are labeled in FIGS. 8 and 9 as B (black) M (magenta) Y (yellow) and C (cyan).

In FIGS. 8 and 9, and voltages applied to the other electrodes are also explained. Co represents the voltages applied to the other odd column electrodes (i.e. the C1 conductors for all other pixels), Ce represents the voltages applied to the other even column electrodes (i.e. the C2 conductors for all other pixels), Ro represents the voltages applied to the other odd row electrodes (i.e. the R1 conductors for all other pixels), and Re represents the voltages applied to the other even row electrodes (i.e. the R2 conductors for all other pixels).

When the same drive conditions can be applied to the other pixels as the pixel being driven, it can be seen that a shared drive phase can be used.

Figure 8B:
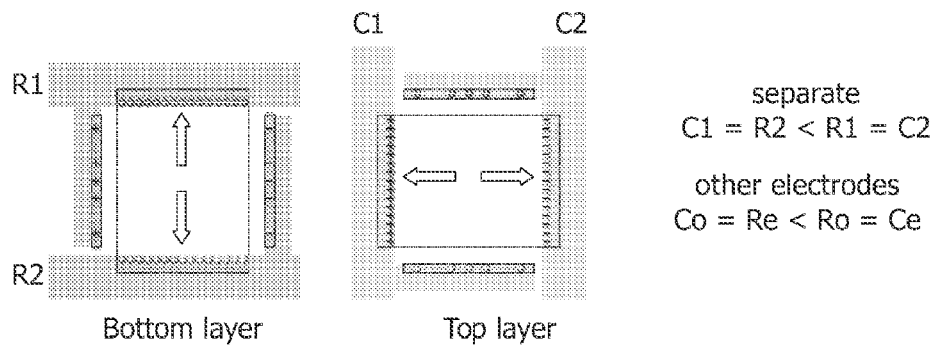

The reset phase drives all particles to their corresponding reservoirs. This is done by first separating the particles in both chambers by their polarities, as shown in FIG. 8B.

For the following explanation it is assumed that the magenta and yellow particles are negatively charged and the black and cyan particles are positively charged.

If the voltage of the first row electrode is made more positive than the second row voltage (R2<R1), then the negatively charged magenta particles will be attracted by the first row electrode, while the positively charged black particles are attracted by the second row electrode. If the second column electrode is made more positive than the first column electrode (C1<C2), then the positive cyan particles will be attracted by the first column electrode, while the second column electrode will attract the negative yellow particles.

This separation phase involves in-plane movement of the particles.

Figure 8C:
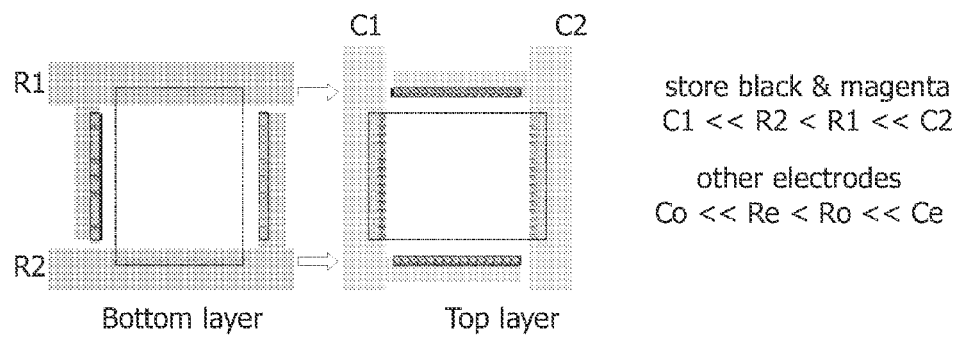

To store the black and magenta particles in their reservoirs, the second row is made much more positive than the first column, as shown in FIG. 8C. Inside the black reservoir between the second row R2 and the (branch) of the first column C1 a large electric field (exceeding the threshold) will be present that attracts the black particles towards the branch of the first column electrode in the top layer. Thus, the particles move transversely to the base of their reservoir, where the electrode branch is located. The same holds for the magenta particles, when the branch of the second column is made much more positive than the first row.

The voltage of the first row electrode is kept more positive than the voltage of the second row, such that the separating force on the black and magenta particles in the visible part of the pixel is still in place. As a logical consequence, the second column voltage will be much larger than the first column voltage, and therefore also the yellow and cyan particles will remain separated. Another logical consequence is that the second column voltage will be much larger than the second row voltage, which will keep the yellow particles outside the yellow reservoir. The same holds for the cyan particles.

As a result, in FIG. 8C, all particles have collected towards the top layer.

Figure 8D:
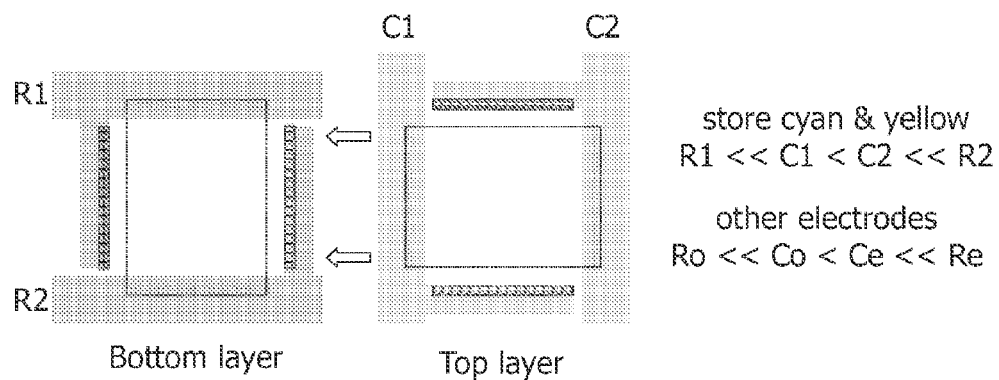

The cyan and yellow particles are then stored in their reservoirs. This is achieved by making the first row much more negative than the first column, and the second row much more positive than the second column. This is shown in FIG. 8D. The second column voltage is maintained above the first column voltage, keeping the cyan and yellow particles separated.

As a logical consequence, the second row voltage will now be much larger than the first row voltage. This would tend to reverse the positions of the black and magenta particles. However, as the black and magenta particles are already stored in their reservoirs, they are not free to move laterally, so that the row voltage difference will have no effect. Another logical consequence is that the second row voltage will be much larger than the first column voltage, this will keep the black particles in their reservoirs and towards the plane of the top layer. The same holds for the magenta particles.

Figure 8E:
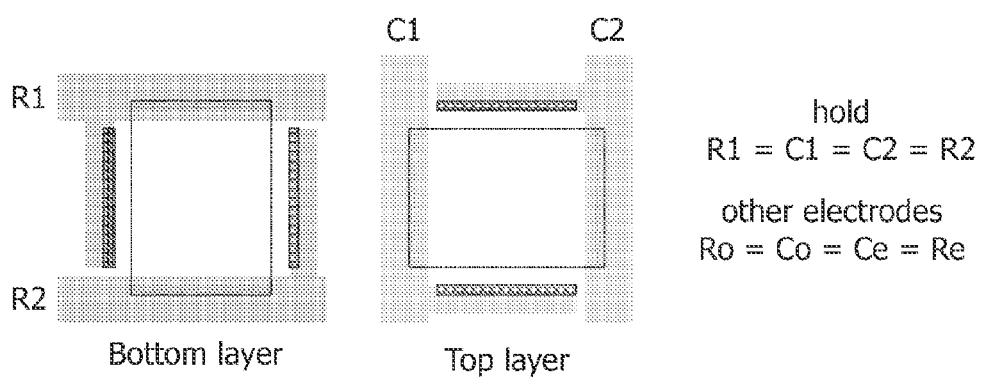

Finally, all voltages are made equal to each other (for example all zero), and all particles species remain in their reservoirs (since Brownian motion is suppressed inside the reservoirs). The visible part of the pixel will remain transparent. This hold state is shown in FIG. 8E.

FIG. 8 thus shows the reset steps which enable all particles to be held in the base of their respective reservoirs.

During the writing phase, for one species after the other, the particles are transferred from their (invisible) reservoirs towards the visible part of the pixel.

Whenever it is desired to keep the particles inside their reservoirs the corresponding step is simply skipped, or when less particles are desired the step is simply applied for a shorter duration in time. The result is that any arbitrary colour can be created by mixing the proper amounts of particles.

Figure 9A:
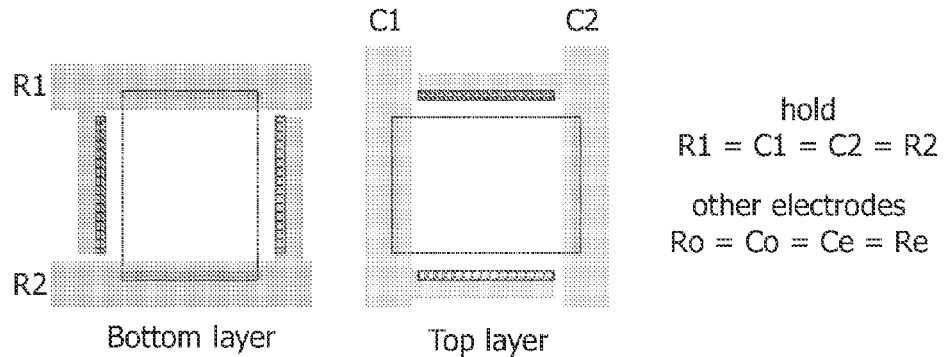
FIGS. 9A to 9H show steps used to drive the device of the invention.

FIG. 9A shows the hold state corresponding to FIG. 8E.

Figure 9B:
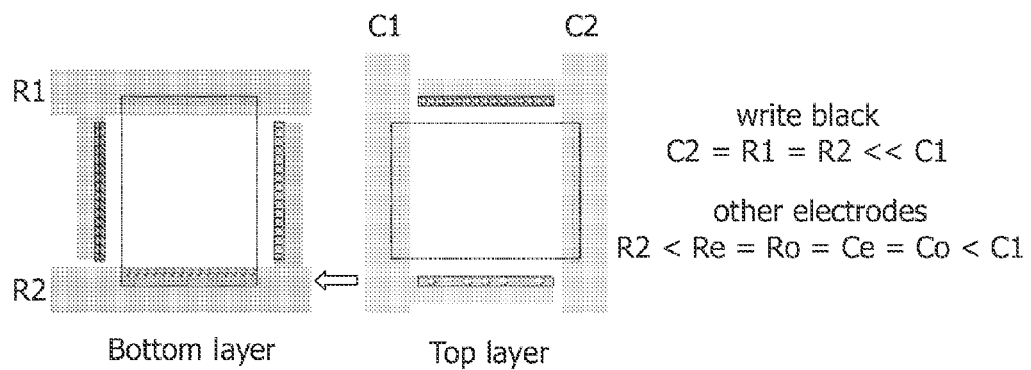

FIG. 9B shows the transfer of black particles from their reservoirs by setting the first column voltage much higher than the second row voltage. Also, the first row and second column voltages are selected equal to the second row voltage. Then, the black particles will leave their reservoir and collect on the second row electrode in the bottom layer, i.e. near the access surface of the reservoir.

At this stage there is no in-plane movement of the black particles as R1=R2.

The shift of black particles can be restricted to the selected pixel by virtue of the threshold. For the selected pixel, C1>>R2 to overcome the threshold voltage. However, for other pixels in the same column, R2 is higher so that C1>R2 for those pixels. For other pixels in the same row, C1 is lower so that C1>R2 for those pixels. Thus, the threshold is only passed at the one pixel where C1 is particularly high and R2 is particularly low (">>" denotes the threshold being exceeded and ">" denotes the threshold not being exceeded).

The cyan particles will also experience an electric force inside their reservoirs, however this is directed such that it keeps the cyan particles inside their reservoir. Also, there will be an electric field between the column electrodes, but this will have no effect since no particles are present in the visible part of the top layer.

Figure 9C:
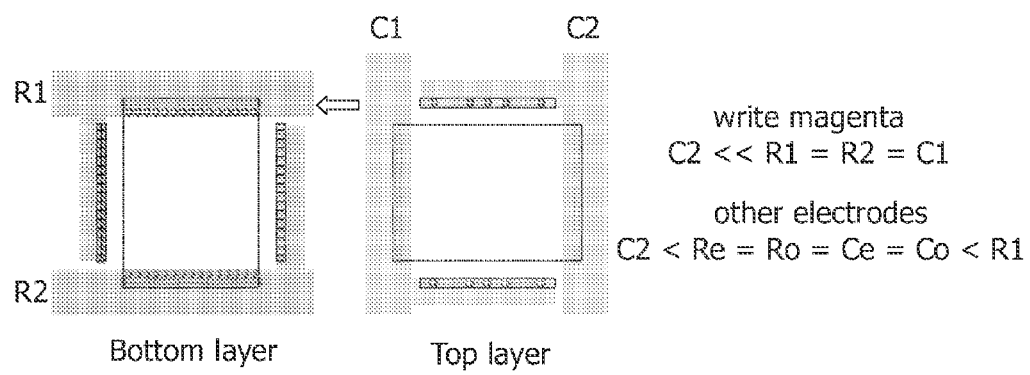

In FIG. 9C, the transfer of magenta particles from their reservoirs is shown by setting the second column voltage much smaller than the first row voltage. The yellow particles also experience a force but stay inside their reservoir.

Again, the shift of magenta particles can be restricted to the selected pixel by virtue of the threshold. For the selected pixel, R1>>C2 to overcome the threshold voltage. However, for other pixels in the same column, R1 is lower so that R1>C2 for those pixels. For other pixels in the same row, C2 is higher so that R1>C2 for those pixels. Thus, the threshold is only passed at the one pixel where R1 is particularly high and C2 is particularly low.

Thus, FIGS. 9B and 9C show the transfer of all reservoir particles towards the bottom layer. The amount of black and magenta particles moved to the bottom layer can be controlled to provide colour control.

Figure 9D:
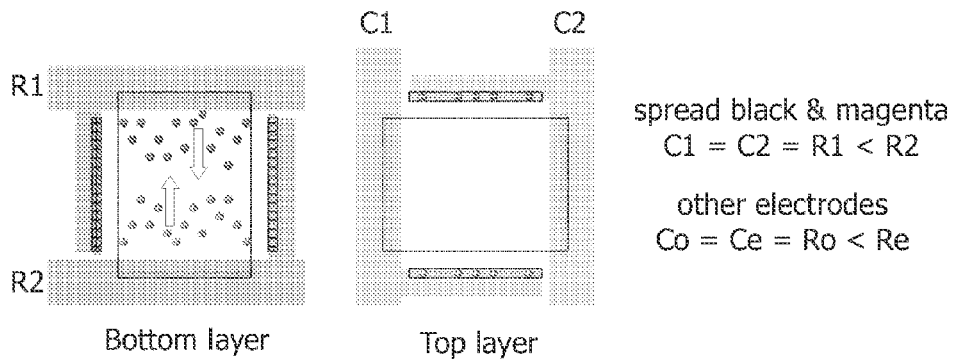

In the following step of FIG. 9D, the black and magenta particles are spread over the visible part of the bottom layer. This is achieved by making the second row voltage moderately more positive than the first row voltage. The first and second column voltages are selected equal to the first row voltage. Therefore the fields inside all reservoirs do not exceed the threshold, and only the black and magenta particles that have been released from the reservoirs in the previous two steps will be spread. When the particles have sufficiently spread throughout the pixel, the drive phase continues to the next step of FIG. 9E.

Figure 9E:
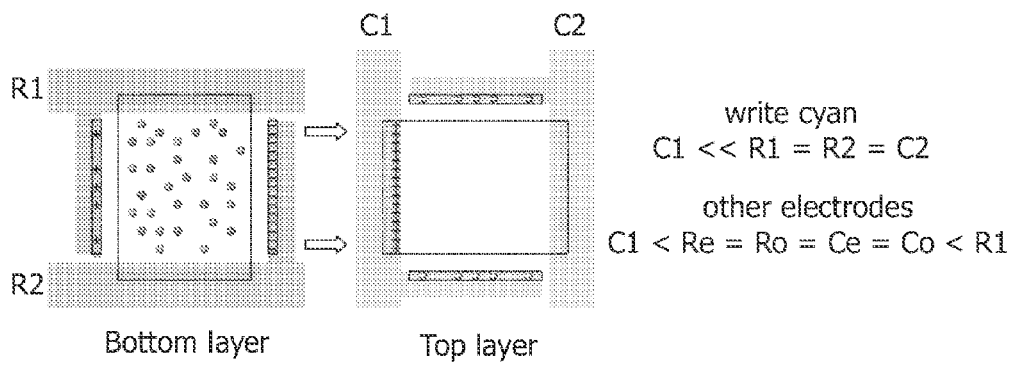

FIG. 9E shows the movement of cyan particles from the base of the reservoir to the surface. The first column electrode is made much more negative than the first row electrode (and the other electrodes). Then, the positively charged cyan particles are pulled outside their reservoir towards the first column electrode. The black and magenta particles will not be disturbed since both row electrodes have equal voltages. Furthermore, the electric field inside the black reservoir will exceed the threshold, but its direction is such that it will not release any black particles.

Again, the shift of cyan particles can be restricted to the selected pixel by virtue of the threshold. For the selected pixel, R1>>C1 to overcome the threshold voltage. However, for other pixels in the same column, R1 is lower so that R1>C1 for those pixels. For other pixels in the same row, C1 is higher so that R1>C1 for those pixels. Thus, the threshold is only passed at the one pixel where R1 is particularly high and C1 is particularly low.

Figure 9F:
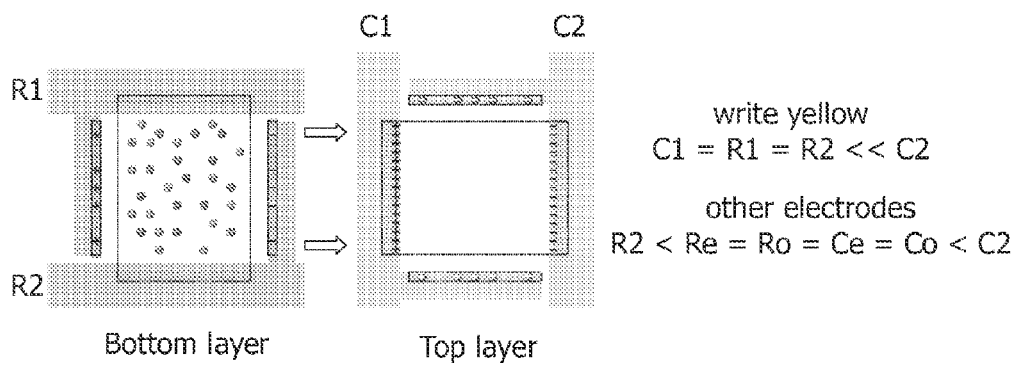

Analogously, the yellow particles are written as shown in FIG. 9F, by setting the second column voltage much larger than the second row voltage (and the other electrodes). Then, the negative yellow particles are released from their reservoir towards the second column electrode. At the same time, the magenta particles inside their reservoir experience a force, but stay inside.

The shift of yellow particles can be restricted to the selected pixel by virtue of the threshold. For the selected pixel, C2>>R2 to overcome the threshold voltage. However, for other pixels in the same column, R2 is higher so that C2>R2 for those pixels. For other pixels in the same row, C2 is lower so that C2>R2 for those pixels. Thus, the threshold is only passed at the one pixel where C2 is particularly high and R2 is particularly low.

Figure 9G:
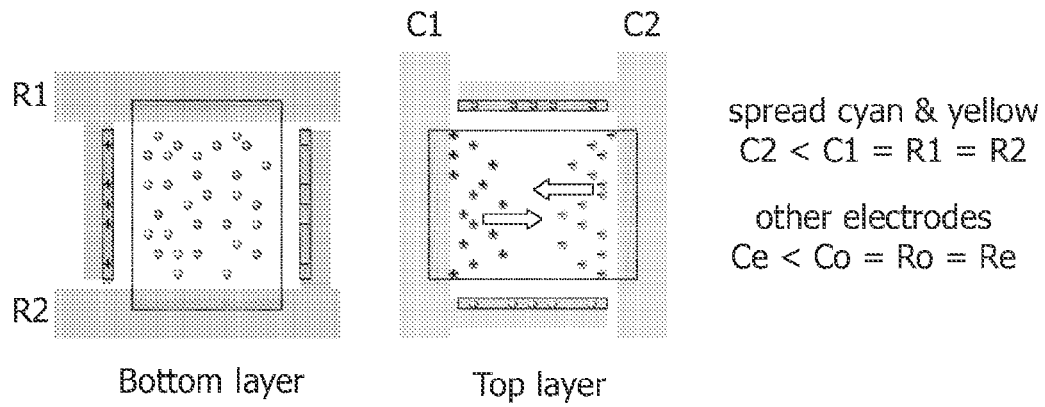
Figure 9H:
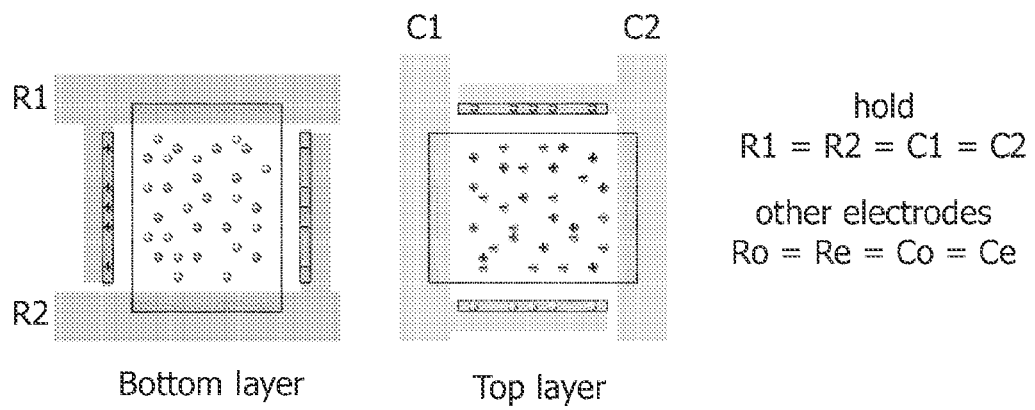

Finally, as shown in FIG. 9G, the cyan and yellow particles are spread over the visible part of the top layer, by setting the second column voltage moderately lower than first column voltage (and the other voltages). When the particles have spread sufficiently, all voltages are made equal to each other, in the hold state of FIG. 9H.

The sequence above thus enables individual pixels to be controlled and with independent control of the four particle species.

It has been described how to build and drive a single pixel. This can be expanded to multiple pixels by simply duplicating all structures in an array. Then, for N by M pixels, 2N column electrodes and 2M row electrodes are required. Full flexibility to address every single pixel is guaranteed.

The writing phase for a full pixel array is preferably divided so that all pixels in the display have their black and magenta data written, followed by a single common spreading phase for those two colours for all pixels. All pixels in the display then have their yellow and cyan data written, followed by a single common spreading phase for those two colours for all pixels.

In particular, the writing phase must be performed for each pixel in turn, whereas the spreading phase can be performed in parallel. This will be apparent from the voltage conditions for "other electrodes" shown in FIGS. 8 and 9.

In the example above, each row of pixels has a dedicated pair of row conductors and each column of pixels has a dedicated pair of column conductors.

Figure 10:
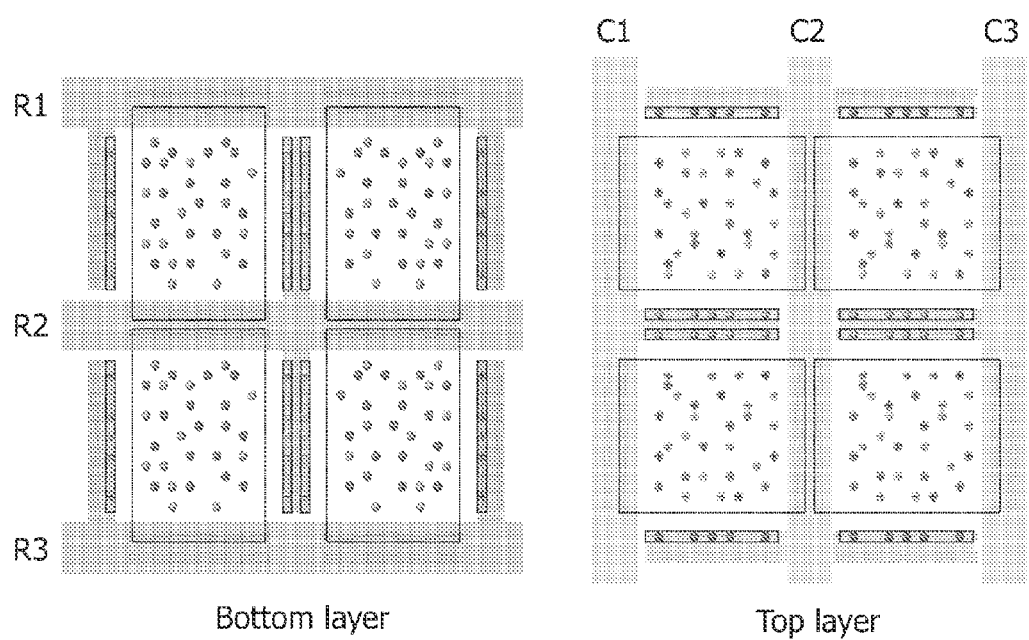
FIG. 10 shows a display device of a second embodiment of the invention.

In an alternative embodiment, the row and column electrodes of neighbouring pixels can be shared, as shown in FIG. 10, which shows an area of 2×2 pixels.

This has the benefit that for N by M pixels only N column electrodes and M row electrodes are required. This is the minimum that is achievable. The risk of shorts between parallel running rows or columns is also reduced.

Figure 11:
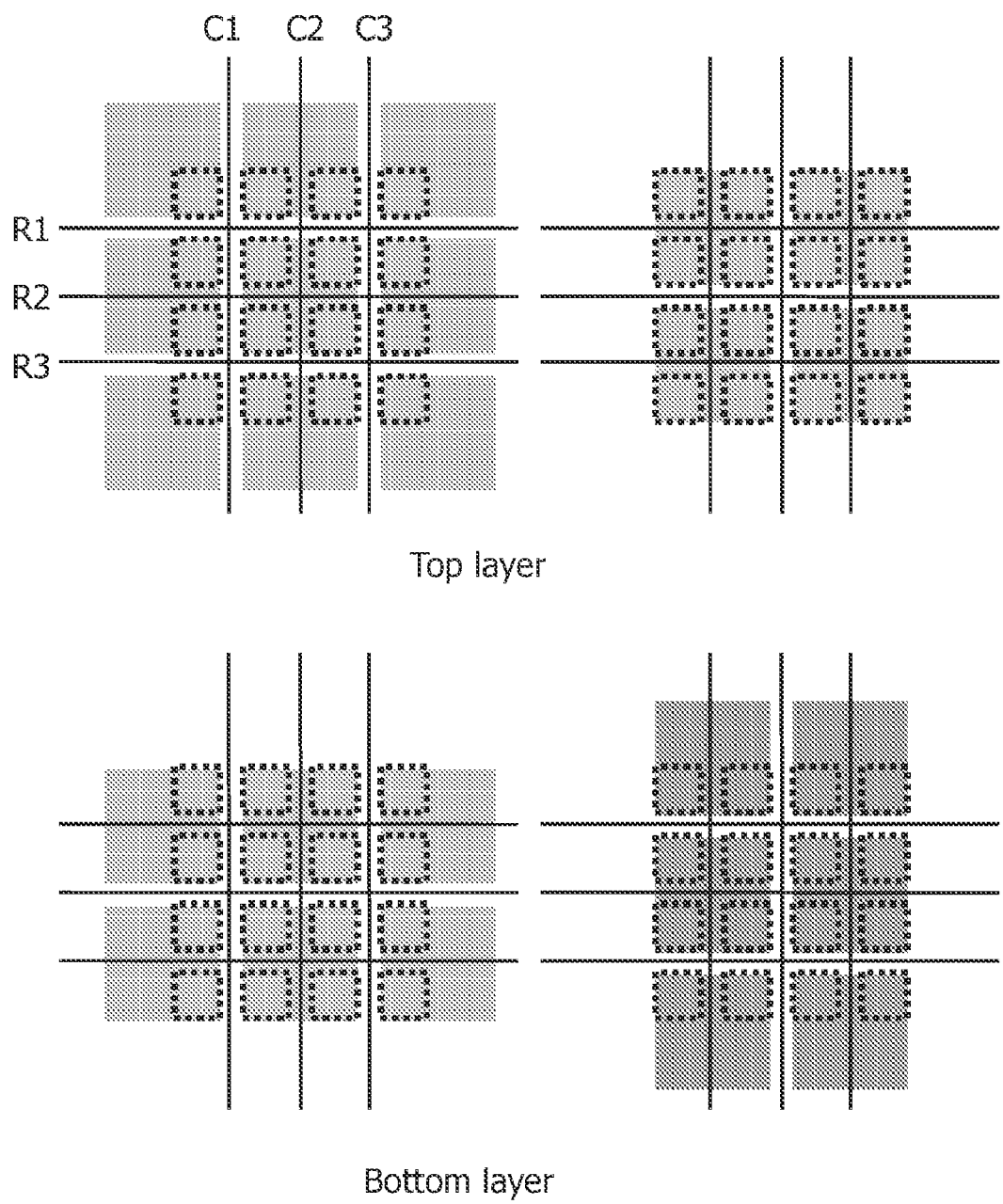
FIG. 11 is used to explain how colours can be controlled in the device of FIG. 10.

The consequence of the electrode sharing is a loss in resolution. But not simply a factor of 2, because for different particle species the shared pixels are different. Shared row electrodes R1, R2 and R3 and shared column electrodes C1, C2 and C3 are used for a four by four pixel layout. The middle 2×2 pixels will share the same yellow intensity. For cyan, magenta and black this will be different sets of 2×2 pixels, and this is illustrated schematically in FIG. 11 which shows squares of colour for the pixels which cannot be independently driven for each colour. With appropriate image processing, the resulting apparent resolution will lie between a single and a 2×2 pixel array, so that the loss of resolution is less than the saving in row and column conductors.

As outlined above, the driving procedure consists of a "reset" phase and a "write" phase.

For an array of pixels the "reset" phase can be performed simultaneously an all pixels, and this will be apparent from FIG. 8 where the drive conditions for all other pixels are the same as for the pixel being reset.

The "writing" phase proceeds row-by-row (or column-by-column).

The critical step is to release the right particle species from their reservoirs, only in the selected positions. This is done by setting the appropriate electrode (out of the four relevant) significantly different from the other three, such that the generated electric field inside the appropriate reservoir exceeds the threshold and has the effective direction for release. All other row and column electrodes should not exceed this threshold.

As example, a threshold voltage of 10V can be assumed. To write black particles into a certain line of pixels, the two bounding row electrodes are put to −6V, all other row electrodes are put to 0V and all even (magenta) columns are put to −6V. The drive voltage on C1 is +6V.

Thus, with reference to FIG. 9B, a 10V threshold can be used with voltages C2=R1=R2=−6V, C1=6V, Re=Ro=Ce=Co=0V.

In those odd (black) columns where +6V is placed, black will be written in pixels intersecting the selected line (since only there the threshold of 10V will be exceeded). For the other odd (black) columns where 0V is placed, nothing will be written.

Then, this is repeated for magenta, row-by-row by setting the rows R1 and R2 to +6V, the odd (black) column to +6V, and the even (magenta) column as desired to −6V or 0V. Thus, with reference to FIG. 9C, C1=R1=R2=6V, C2=−6V, Re=Ro=Ce=Co=0V.

After all desired black and magenta reservoirs have been emptied, the black and magenta particles are spread for all pixels simultaneously by putting the even rows to +6V, while all other electrodes are at 0V. Thus, with reference to FIG. 9D, R2=Re=6V, R1=Ro=C1=C2=Co=Ce=0V.

Then in analogous manner, row-by-row the desired cyan and yellow particles are released from their reservoirs, and simultaneously spread throughout the pixel.

Finally all rows and columns can be placed to 0V, to hold the written image without any power dissipation. Thus, with reference to FIG. 9H, the hold voltage is R1=R2=C1=C2=Re=Ro=Ce=Co=0V.

The invention enables a high brightness, full colour and low power display to be formed, and is particularly suitable for electronic paper, signage, and billboard applications, although the invention can also be used in small displays such as price tags.

Various modifications will be apparent to those skilled in the art.

The invention claimed is:

1. An electrophoretic display device, comprising an array of rows and columns of display pixels,
    wherein each of the pixels comprises first and second row electrodes and first and second column electrodes, wherein
        the first column electrode has a first portion extending in a first direction, and a first branch extending from the first portion in a second direction different from the first direction and overlapping with the first row electrode,
        the first row electrode has a second portion extending in the second direction, and a second branch extending from the second portion in the first direction and overlapping with the second column electrode,
        the second column electrode has a third portion extending in the first direction, and a third branch extending from the third portion in the second direction and overlapping with the second row electrode, and
        the second row electrode has a fourth portion extending in the second direction, and a fourth branch extending from the fourth portion in the first direction and overlapping with the first column electrode, and
        wherein between each of the four branch/electrode overlaps, a respective particle reservoir is located, the respective branch/electrode pair being for controlling movement of particles associated with the respective particle reservoir.

2. The device as claimed in claim 1, wherein the movement of the particles associated with each particle reservoir has a threshold voltage behaviour.

3. The device as claimed in claim 1, wherein
    each of the pixels comprises a pixel viewing area,
    the reservoirs are located outside the pixel viewing area, and
    each pixel of the pixels comprises first and second particle chambers within the viewing area, the first and second particle chambers being stacked one above the other.

4. The device as claimed in claim 3, wherein
    the first particle chamber is connected to first and second ones of the reservoirs, and
    the second particle chamber is connected to third and fourth ones of the reservoirs.

5. The device as claimed in claim 4, wherein
    particles in the first one of the reservoirs are positively charged, and
    particles in the second one of the reservoirs are negatively charged.

6. The device as claimed in claim 4, wherein
    the second portion and the fourth portion of the first and second row electrodes are for controlling the movement of particles of the first and second ones of the reservoirs connected to the first particle chamber, and
    the first portion and the third portion of the first and second column electrodes are for controlling the movement of particles of the third and fourth ones of the reservoirs connected to the second particle chamber.

7. The device as claimed in claim 6, wherein the second branch and the fourth branch of the first and second row electrodes are for controlling the movement of particles within the third and fourth ones of the reservoirs connected to the second particle chamber with threshold, and
    the first branch and the third branch of the first and second column electrodes are for controlling the movement of particles within the first and second ones of the reservoirs connected to the first particle chamber with threshold.

8. The device as claimed in claim 7, wherein the threshold is provided by a layer between bases of the reservoirs and the branches.

9. The device as claimed in claim 3, wherein movement of the particles between a reservoir and a particle chamber is substantially laterally.

10. The device as claimed in claim 9, wherein the reservoir stores particles out of a lateral plane of particle movement.

11. The device as claimed in claim 1, wherein the particles comprise absorbing particles.

12. The device as claimed in claim 11, wherein particles associated with a first one of the reservoirs comprise cyan particles (C), particles associated with another reservoir a second one of the reservoirs comprise magenta (M) particles, particles associated with a third one of the reservoirs comprise yellow (Y) particles, and particles associated with a fourth one of the reservoirs comprise black particles (B).

13. The device as claimed in claim 1, wherein each of the pixels is bounded by the second portion and the fourth portion of the two row electrodes and the first portion and the third portion of the two column electrodes.

14. The device as claimed in claim 1, wherein each of the pixels is substantially bounded by the second branch and the fourth branch of the two row electrode branches and the first branch and the third branch of the two column electrode branches.

15. The device as claimed in claim 1, wherein the electrodes are non-transparent.

16. The device as claimed in claim 15, wherein the electrodes are black.

17. The device as claimed in claim 1, wherein each row and column electrode is shared between two neighbouring pixels.

18. A method of driving an electrophoretic display device, comprising an array of rows and columns of display pixels, each pixel comprising four particle reservoirs for four different particle species, first and second row conductors and first and second column conductors, the method comprising:

resetting the display pixels by driving all particle species into their respective reservoirs by applying a first voltage to the first row conductor and the second column conductor and a second voltage to the second row conductor and the first column conductor, the first voltage being greater than the second voltage;

moving particles of the first species vertically towards an access surface of the respective reservoir, and moving particles of the second species vertically towards an access surface of the respective reservoir, the particle movement being carried out for the pixels in turn;

spreading particles of the first and second species within a first chamber, the spreading being carried out for all pixels in parallel, and providing lateral movement of particles from the access surface of the reservoirs into a viewing area of the pixel;

moving particles of the third species vertically towards an access surface of the respective reservoir, and moving particles of the fourth species vertically towards an access surface of the respective reservoir, the particle movement being carried out for the pixels in turn; and spreading particles of the third and fourth species within a second chamber, the spreading being carried out for all pixels in parallel, and providing lateral movement of particles from the access surface of the reservoirs into a viewing area of the pixel.

19. The method as claimed in claim 18, further comprising applying hold voltages to the row and column conductors.

20. The method as claimed in claim 18, wherein moving particles comprises applying row and column conductor voltages such that a threshold voltage between a row and column conductor pair is exceeded only for a selected pixel, one of the pixel reservoirs being provided between the row and column conductor pair.

21. The method as claimed in claim 18, wherein resetting the display pixels comprises:

moving particles of the four species laterally towards the access surface of their respective reservoirs from the viewing area of the pixel;

moving particles of the first and second species within the respective reservoir towards a base surface of the respective reservoir; and moving particles of the third and fourth species within the respective reservoir towards a base surface of the respective reservoir.

22. The method as claimed in claim 21, further comprising applying hold voltages to the row and column conductors.

* * * * *